United States Patent
Fu et al.

(10) Patent No.: US 9,111,012 B2
(45) Date of Patent: Aug. 18, 2015

(54) DATA CONSISTENCY MANAGEMENT

(71) Applicant: ACCENTURE GLOBAL SERVICES LIMITED, Dublin (IE)

(72) Inventors: Chen Fu, Cupertino, CA (US); Sugi Venugeethan, Milpitas, CA (US); Kunal Taneja, San Jose, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 146 days.

(21) Appl. No.: 13/685,351

(22) Filed: Nov. 26, 2012

(65) Prior Publication Data
US 2014/0149400 A1    May 29, 2014

(51) Int. Cl.
*G06F 17/30* (2006.01)

(52) U.S. Cl.
CPC .... *G06F 17/30979* (2013.01); *G06F 17/30575* (2013.01)

(58) Field of Classification Search
CPC ....................................................... G06F 17/00
USPC ......................................... 707/759, 760, 761
See application file for complete search history.

(56) References Cited

U.S. PATENT DOCUMENTS

| | | | |
|---|---|---|---|
| 5,819,251 A | 10/1998 | Kremer et al. | |
| 6,795,825 B2 | 9/2004 | Rishe | |
| 7,567,968 B2 | 7/2009 | Desai et al. | |
| 7,730,079 B2 | 6/2010 | Meijer et al. | |
| 8,005,866 B2 | 8/2011 | Sureka | |
| 2002/0013790 A1 | 1/2002 | Vandersluis | |
| 2011/0258178 A1 | 10/2011 | Eidson et al. | |
| 2011/0258225 A1 | 10/2011 | Taylor et al. | |
| 2011/0258630 A1 | 10/2011 | Fee et al. | |
| 2012/0078974 A1 | 3/2012 | Meijer | |
| 2012/0158655 A1 | 6/2012 | Dove et al. | |
| 2012/0330686 A1* | 12/2012 | Wirth et al. | 705/4 |
| 2013/0110742 A1* | 5/2013 | Golembiewski et al. | 705/36 R |

(Continued)

FOREIGN PATENT DOCUMENTS

| | | | |
|---|---|---|---|
| WO | 2012061310 A2 | 5/2012 | |
| WO | 2012087366 A1 | 6/2012 | |

OTHER PUBLICATIONS

Bain, Tony, "Is the Relational Database Doomed?", Read Write Web, Feb. 12, 2009. <http://www.cs.utexas.edu/users/downing/papers/RelationalDatabaseDoomed2009.pdf>.

(Continued)

*Primary Examiner* — Baoquoc N To
(74) *Attorney, Agent, or Firm* — Mannava & Kang, P.C.

(57) ABSTRACT

A data consistency management system may include a memory storing machine readable instructions to receive a query, and determine a suitability of the query for processing by a NoSQL data store, or a RDBMS. The memory may further include machine readable instructions to rank data tables based on a combination of read queries and query patterns suitable for the NoSQL data store. Based on the ranking, the memory may further include machine readable instructions to determine data tables that are to be managed by the NoSQL data store, or by the RDBMS, determine whether the query is for a data table managed by the NoSQL data store, and based on a determination that the query is for a data table managed by the NoSQL data store, translate the query to NoSQL API calls for using the NoSQL data store to respond to the query.

20 Claims, 11 Drawing Sheets

(56) References Cited

U.S. PATENT DOCUMENTS

| | | | |
|---|---|---|---|
| 2014/0047413 A1* | 2/2014 | Sheive et al. | 717/110 |
| 2014/0068404 A1* | 3/2014 | Stiffler et al. | 715/227 |

OTHER PUBLICATIONS

"Key—Value store vs. Relational database in Cloud context", Infosys, 2010. <http://www.infosysblogs.com/cloud/2010/05/k-v_store_vs_relational_database_in_cloud_context.html>.

Thomson, Alexander, et al., "Calvin: Fast Distributed Transactions for Partitioned Database Systems", Yale University, May 2012.

Stonebraker, Mike, et al., "C-Store: A Column-oriented DBMS", 2005.

Terry, Douglas B., et al., "Managing Update Conflicts in Bayou, a Weakly Connected Replicated Storage System", 1995.

Fitzpatrick, Brad, "Distributed Caching with Memcached", Aug. 1, 2004; Linux Journal, Software. <http://www.linuxjournal.com/article/7451>.

Plugge, Eelco, et al., "The Definitive Guide to MongoDB the NoSQL Database for Cloud and Desktop Computing", Apress, Sep. 24, 2010, Chapter 11-12, pp. 241-291.

Anderson, J. Chris, et al., "CouchDB The Definitive Guide", O'Reilly, —Feb. 2, 2010 Chapter 2, 16, and 15; pp. 11-20 and 145-152.

Australia Patent Office, front page of "specification as granted" of AU patent application No. 2013260715, dated Feb. 26, 2015, 1 page.

Priya Gupta et al: "A Trigger-Based Middleware Cache for ORMs", Dec. 12, 2011, Middleware 2011, Spinger Berlin Heidelberg, Berlin, Heidelberg, pp. 329-349.

Jithin Jose et al: "Memcached Design on High Performance RDMA Capable Interconnects", Parallel Processing (ICPP), 2011 International Conference on, IEEE, Sep. 13, 2011, pp. 743-752.

European Patent Office, "The extended European Search report on EP Application No. 13005454.7", dated Nov. 3, 2014, 8 pages.

* cited by examiner

DATA CONSISTENCY MANAGEMENT

BACKGROUND

Cloud computing generally includes the use of computing resources that are delivered as a service over a network. For applications, such as, for example, enterprise applications, cloud computing can offer elastic scaling to fit the execution needs of such applications. For example, for enterprise applications that may encounter a high volume of user requests, cloud computing can provide for services to be readily deployed in multiple servers to concurrently serve user requests. Enterprise systems typically use a relational database as the data tier to provide transaction support and ensure data consistency. Achieving scaling and data consistency using cloud computing can be challenging.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
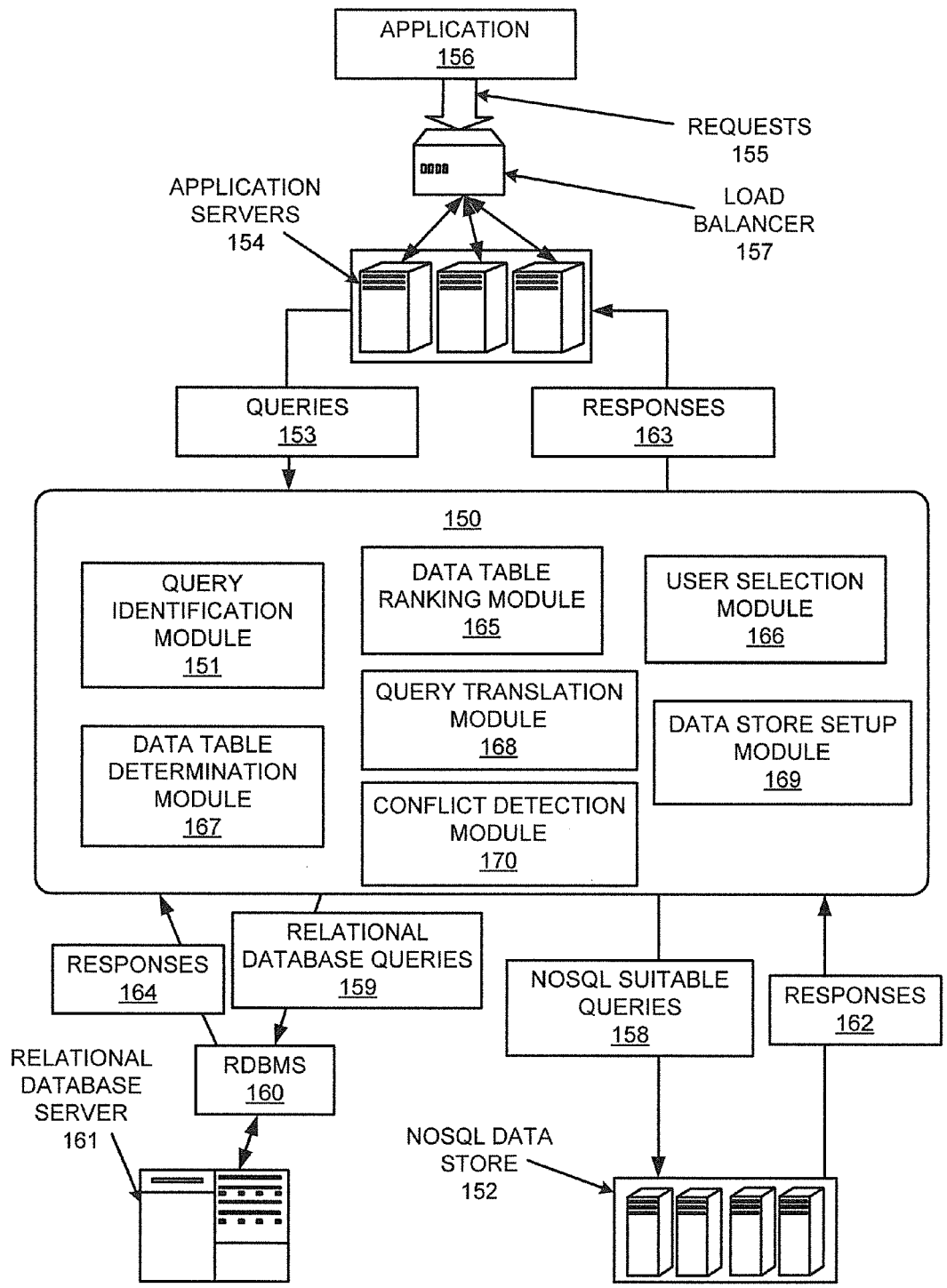
FIG. 1 illustrates an architecture of a data consistency management system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Cloud computing may provide a computing platform, for example, for deploying database-centric, service oriented applications. Cloud computing may also provide for elastic scaling, where virtually unlimited throughput may be achieved by adding servers if workload increases, and operation cost may be reduced by removing servers if workload decreases. Database-centric applications may rely on relational database management systems (RDBMSes) to manage data and provide data consistency in the presence of concurrent client requests. RDBMSes may guarantee strong data consistency by providing transactional support based on an ACID (i.e., atomic, consistent, isolated, and durable) property. The ACID property may ensure correctness of many database-centric applications. However, supporting ACID based transactions over a distributed system, such as, for example, a cloud computing environment, may result in performance overhead, and may further hinder scalability. For example, it may take a significant amount of time for all servers participating in a transaction to reach an agreement at commit time to ensure atomicity and durability with respect to the ACID property. With respect to the isolation aspect for the ACID property, locks for a transaction may need to be held, for example, for the full duration of a two-phase commit protocol to ensure isolation. Further, based on a principle that consistency, availability and partition-tolerance cannot be achieved at the same time, preserving consistency in the presence of network partition may lead to unavailability. Thus, RDBMSes may provide the ACID property at the expense of performance and availability.

Generally, transaction support with strong consistency guarantee may be needed on part of the data for a transaction. For example, in an online shopping web site, while transaction support may be of importance for purchase orders, transaction support may not be considered essential for product descriptions. Thus, it may be possible to trade consistency on part of certain data for higher performance and availability. However, a RDBMS alone may not offer flexibility for tradeoff between performance and availability on the one hand, and data consistency on the other. In this regard, non-relational database management systems, denoted not-only structured query language (NoSQL) systems, may provide higher performance, scalability and availability in a cloud computing environment by forgoing the ACID property. For example, a NoSQL system may achieve scalability and availability in a cloud computing environment by forgoing the consistency guarantee, and instead support eventual consistency, where all updates will either reach all replicas eventually, or be discarded due to later updates to the same data items. For example, data tables that do not require the ACID property may be identified, and a NoSQL system may be used to manage the data for the identified data tables to improve performance. However, for applications for which transaction support is essential, RDBMSes may still be needed.

A NoSQL system may be based on a relaxed consistency model. With respect to the relaxed consistency model of a NoSQL system, this model may lead to data inconsistency with undesired consequences. For example, since it may take time for an update to reach all replicas in a data table, read queries may return outdated data, and concurrent updates may result in confliction. For example, if two individuals share a bank account, and each individual electronically withdraws the entire balance of the bank account at the same time under their own name, the two requests may be served by two different servers holding two different replicas of the same account data. With eventual consistency, these two requests may both go through, resulting in overdraft of the account. When these two updates are propagated to the same replica eventually, a conflict would be detected.

The need for consistency versus performance and availability may be balanced by using both NoSQL systems and RDBMSes to manage data. However, it may take significant effort to use a combination of a NoSQL and RDBM based system in the same application to improve performance. First, data tables whose access performance significantly affects that of the whole application may be identified. Second, data that does not require the ACID property may be identified. Third, since most NoSQL systems do not support rich semantic of SQL, such as, for example, join and transaction, a determination may be made whether the selected tables are only subject to queries that are supported by the NoSQL system. Data in the selected tables may be copied from the RDBMS to the NoSQL system, and all the SQL queries related to the selected tables may be rewritten to NoSQL system APIs. This process may require extensive knowledge regarding the semantics of the data and the data access patterns, and can be prone to error.

Figure 2:
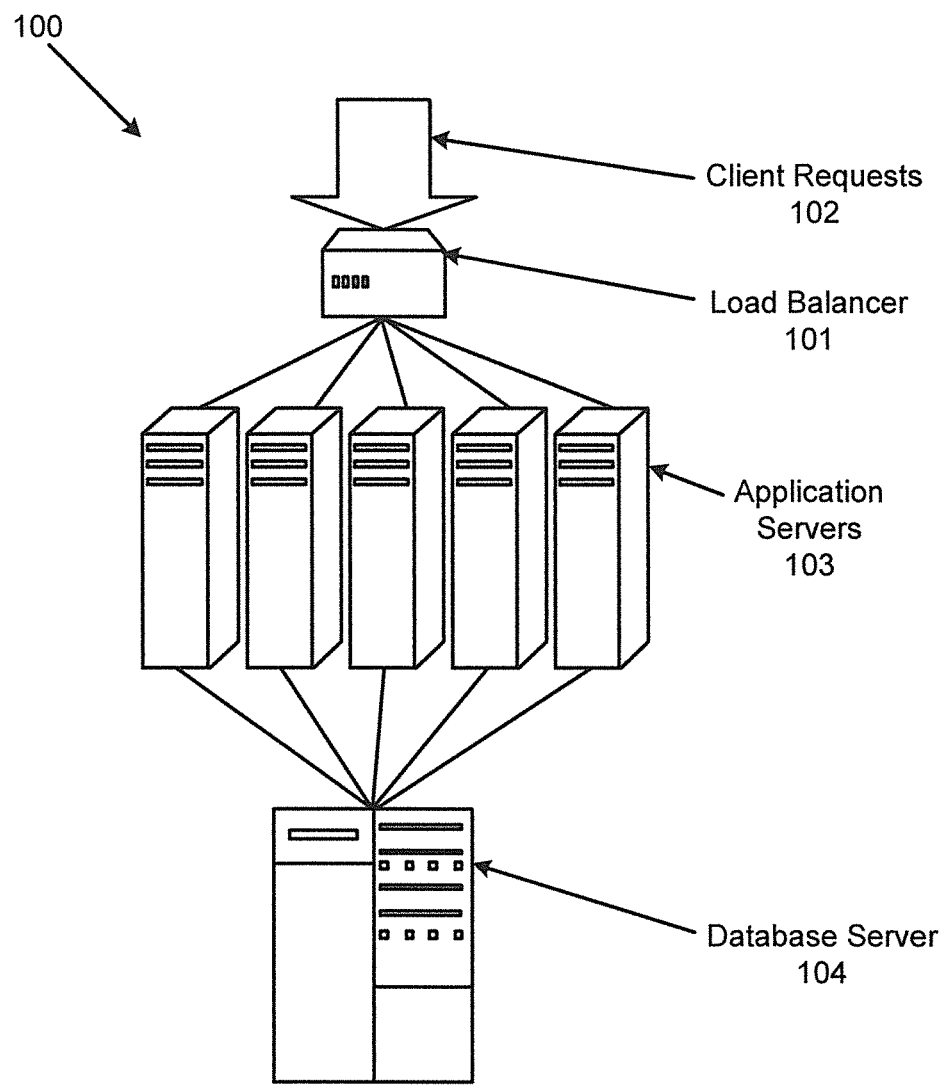
FIG. 2 illustrates a single database architecture for use with a database-centric application, according to an example of the present disclosure.

For example, referring to FIG. 2, a single database architecture 100 for use with a database-centric application is shown, according to an example of the present disclosure. The single database architecture 100 may generally include a load balancer 101 to dispatch requests 102 from clients to application servers 103 that may execute application logic. The application servers 103 may process the client requests 102, issue data queries to a relational database server 104 according to the requests, assemble data returned by the relational database server 104 and return the assemble data back to the client. The single database architecture 100 may provide for elastic scaling at the application server layer (i.e., layer for the application servers 103), for example, by adding or removing servers in the application server layer based on changing client demands. However, at the database layer (i.e., layer for the relational database server 104), if the database server 104 is overloaded, the database server 104 may need to be replaced with a higher capacity database server. Thus, the database server 104 may need to be provisioned for peak workload.

Figure 3:
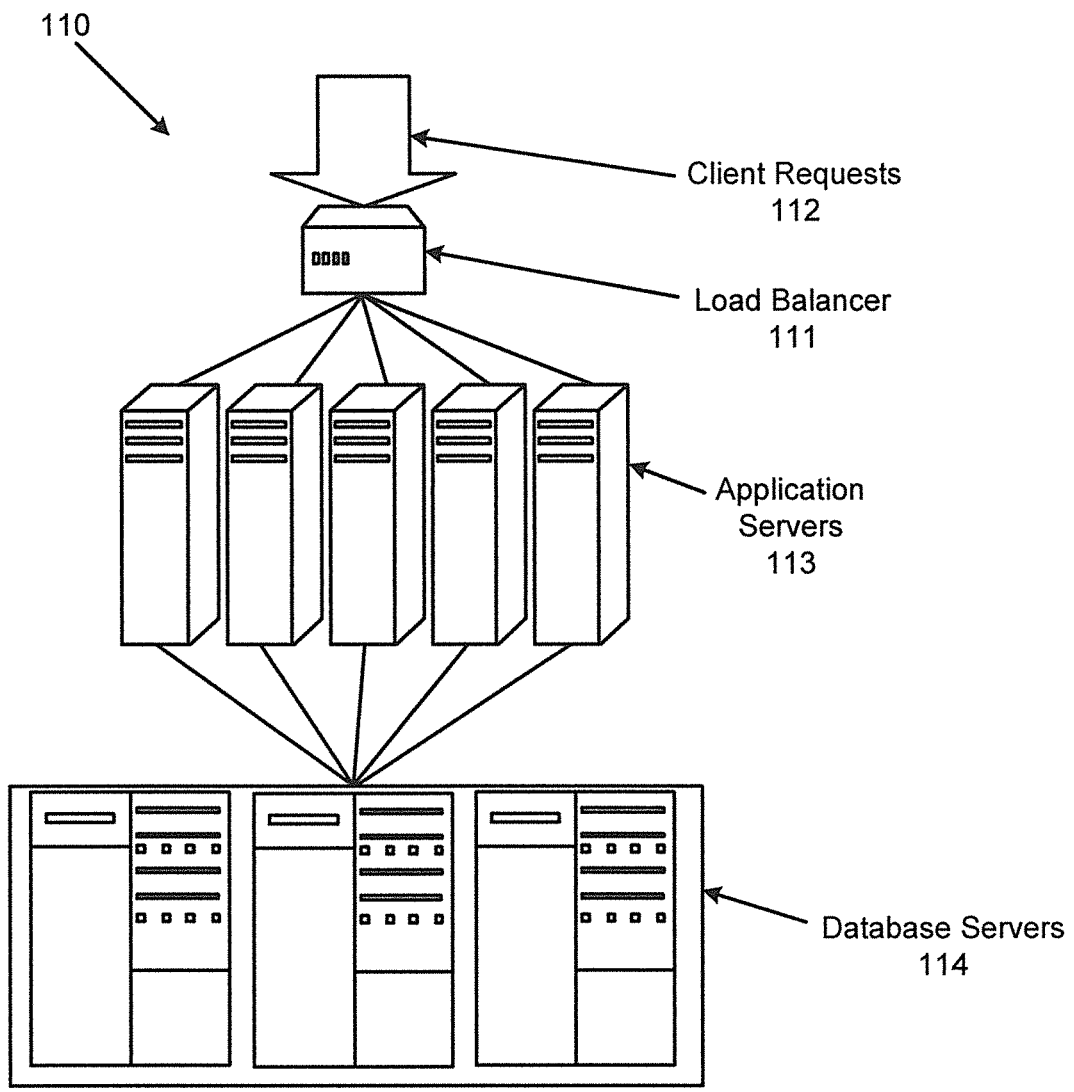
FIG. 3 illustrates a data partition architecture, according to an example of the present disclosure.

Referring to FIG. 3, a data partition architecture 110 is shown, according to an example of the present disclosure. Compared to the single database architecture 100 of FIG. 2 that includes the single relational database server 104, for the data partition architecture 110, data may be partitioned into several parts and each part may be controlled by a separate database server. For example, the data partition architecture 110 may generally include a load balancer 111 to dispatch requests 112 from clients to application servers 113 that may execute application logic. Compared to the single database architecture 100, the data partition architecture 110 may include the potential to distribute workload on multiple database servers 114 to improve performance. However, adding or removing the database servers 114 based on varying workload may require repartition of data over the new set of the database servers 114. The repartitioning may lead to moving data between different database servers 114, and redirecting queries related to moved data to the new database servers 114 containing the moved data.

Figure 4:
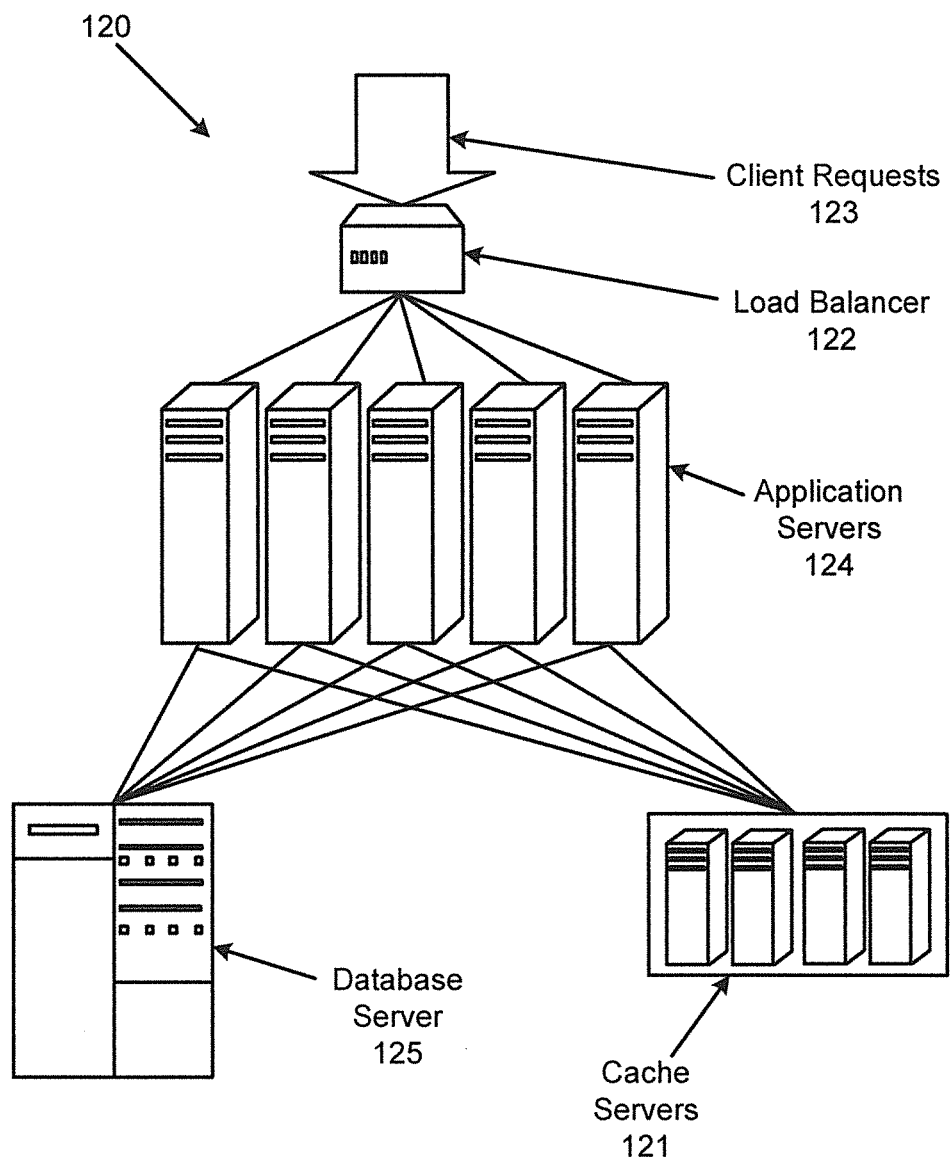
FIG. 4 illustrates a cache architecture, according to an example of the present disclosure.

Referring to FIG. 4, a cache architecture 120 is shown, according to an example of the present disclosure. The cache architecture 120 may include cache servers 121 that function as read cache. The cache architecture 120 may generally include a load balancer 122 to dispatch requests 123 from clients to application servers 124 that may execute application logic. Read queries from the application servers 124 may be redirected to the cache servers 121 instead of a primary database server 125, which thus provides faster response to read queries and reduces load on the primary database server 125. The cache architecture 120 including the cache servers 121 may thus facilitate scaling, compared to the single database architecture 100 and the data partition architecture 110. The cache servers 121 may include, for example, read only replicas of the primary database server 125, or a NoSQL data store.

As discussed herein, since queries from the application servers 124 can be directed to the primary database server 125 or the cache servers 121, read queries from the application servers 124 may be redirected to the cache servers 121 instead of a primary database server 125, which thus provides faster response to read queries and reduces load on the primary database server 125. However, since the time for an update to certain data for the primary database server 125 may exceed the time for the same update to be propagated to the cache servers 121, read queries for the data subject to update may return outdated data. In this regard, the data consistency management system, and the method for data consistency management may determine the queries that can tolerate outdated data, and redirect such queries to a NoSQL data store. Thus, the system and method described herein may determine the appropriate queries suitable for processing by the NoSQL data store depending on access patterns of data.

The data consistency management system, and the method for data consistency management may determine the appropriate queries that can tolerate outdated data, for example, by considering semantics of the data and the application logic processing the data, in order to identify data where transaction support can be eliminated without affecting correctness. The system and method may determine how data are accessed by applications, and based on the access pattern, use a NoSQL data store for benefitting from the performance of these accesses. The system and method may reduce the amount of effort needed for creating data structures in a NoSQL data store, and translate original code containing SQL queries to a RDBMS to sequences of API calls to the NoSQL data store. The system and method may also determine when a NoSQL data store can accept update requests, and thus reduce the amount of effort to add the logic of conflict resolution.

The data consistency management system, and the method for data consistency management may provide an automated approach for determining the tradeoff between data consistency versus scalability, thus accelerating the process of augmenting the data tier with NoSQL data stores for scalability on the cloud. The system and method may automate the process of adding a NoSQL data store for database-centric applications built on top of RDBMSes. The system and method may monitor database queries issued by an application, and identify data tables with query patterns that are most suitable to be managed by a NoSQL data store. Based on a determination that a certain data table may be managed by a NoSQL data store, the system and method may create data structures in the NoSQL data store according to the data schema of the table, and translate SQL queries to the data table into corresponding NoSQL APIs. The system and method may automatically identify data tables that, if managed by a NoSQL data store, may result in reduced latency and improved throughput. Based on the automatic or user-based selection of the identified data tables, the selected data tables may be managed by the NoSQL data store. For example, if most queries to a data table retrieve or update a few rows via a primary key, with a high read to write ratio, then using a key-value store for the NoSQL data store to manage the data table may result in improved performance.

The data consistency management system, and the method for data consistency management may identify query patterns suitable for a NoSQL data store. Specifically, the system and method may identify data queries to determine whether the queries may execute faster in a NoSQL data store. For example, the system and method may identify query patterns that include all select queries that retrieve a set of data fields from a single table with a "where" clause containing a comparison expression, and the primary key for the table appears in the where clause. Such queries may be supported by key-value stores with high performance.

The system and method may rank data tables with a linear combination of percentage of read queries and percentage of query patterns suitable for a NoSQL data store. Using NoSQL data stores to manage higher ranked data tables may achieve improved performance gain. The ranked data tables may be presented to a user of the data consistency management system, to allow the user to decide which table can tolerate data inconsistency, and thus can be managed using a NoSQL data store. Alternatively, the system and method may automatically determine which table can tolerate data inconsistency from the ranked data tables, and thus can be managed using a NoSQL data store.

The system and method may automatically translate read queries targeting at the selected tables to NoSQL API calls. Specifically, once the user, or the system and method automatically determine a set of tables can be managed by a NoSQL data store, read queries targeting the selected tables may be automatically translated to NoSQL API calls. Update queries may continue to be served by the RDBMS. However, based on the logic for conflict resolution, the system and method may automatically translate update queries to NoSQL API calls. The system and method may be provided, for example, between an application and a RDBMS, and dynamically monitor SQL queries issued by the application to identify query patterns and perform query translation.

The system and method described herein provide a technical solution to the technical problem of data consistency management. In many instances, manual data consistency management is not a viable solution given the heterogeneity and complexity of queries and data tables, and variability involved in manual data consistency management, which can lead to inconsistent results. The system and method described herein provide the technical solution of objectively determining a suitability of a query for processing by a NoSQL data store, or a RDBMS. The system and method described herein also provide the technical solution of objectively ranking data tables based on a combination of read queries for the data tables and query patterns suitable for the NoSQL data store for the data tables, and determine data tables from the ranked data tables that are to be managed by the NoSQL data store, or by the RDBMS. The system and method described herein also provide the technical solution of translating a query to NoSQL API calls for using the NoSQL data store to respond to the query.

FIG. 1 illustrates an architecture of a data consistency management system 150, according to an example of the present disclosure. The data consistency management system 150 may generally include a query identification module 151 to identify query patterns suitable for a NoSQL data store 152. The query patterns may be based on queries 153 received from application servers 154. The application servers 154 may receive requests 155 from an application 156, with the requests 155 being dispatched by a load balancer 157. From the queries 153, NoSQL suitable queries 158 that are suitable for the NoSQL data store 152 may be forwarded to the NoSQL data store 152 for processing, and relational database queries 159, that may not be considered suitable for the NoSQL data store 152, may be forwarded to a RDBMS 160 for processing by a relational database server 161. For example, tables in which relatively few inserts and/or update queries are executed may be suitable for the NoSQL data store 152 that may include a key-value store and/or a column oriented store. Further, relational database queries 159 that may not be considered suitable for the NoSQL data store 152, such as, for example, insert or update queries, or queries directed to tables in which a relatively high percentage of inserts and/or update queries are executed, may be forwarded to the RDBMS 160 for processing by the relational database server 161. Responses 162 to the NoSQL suitable queries 158 may returned from the NoSQL data store 152, via the system 150, to the application 156 as responses 163. Similarly, responses 164 to the relational database queries 159 may returned from the relational database server 161, via the system 150, to the application 156 as the responses 163. A data table ranking module 165 is to rank data tables with a linear combination of percentage of read queries and percentage of query patterns suitable for the NoSQL data store 152. A user selection module 166 is to present the ranked data tables to a user (e.g., via a user interface) to allow the user to decide which data table can tolerate data inconsistency, and thus can be managed using the NoSQL data store 152. Alternatively, a data table determination module 167 is to automatically determine which data table can tolerate data inconsistency from the ranked data tables, and thus can be managed using the NoSQL data store 152. A query translation module 168 is to automatically translate read and/or update queries targeting the selected data tables using the user selection module 166 or by the data table determination module 167 to NoSQL API calls. Thus, the NoSQL suitable queries 158 may be automatically translated by the query translation module 168 and forwarded to the NoSQL data store 152. The data store setup module 169 is to create a data structure in the NoSQL data store 152 according to the structure of the original table. A conflict detection module 170 is to detect and identify possible conflicts and resolution with respect to queries, such as, for example, update queries.

As described herein, the modules and other elements of the system 150 may comprise machine readable instructions stored on a non-transitory computer readable medium. In addition, or alternatively, the modules and other elements of the system 150 may comprise hardware or a combination of machine readable instructions and hardware.

Figure 5:
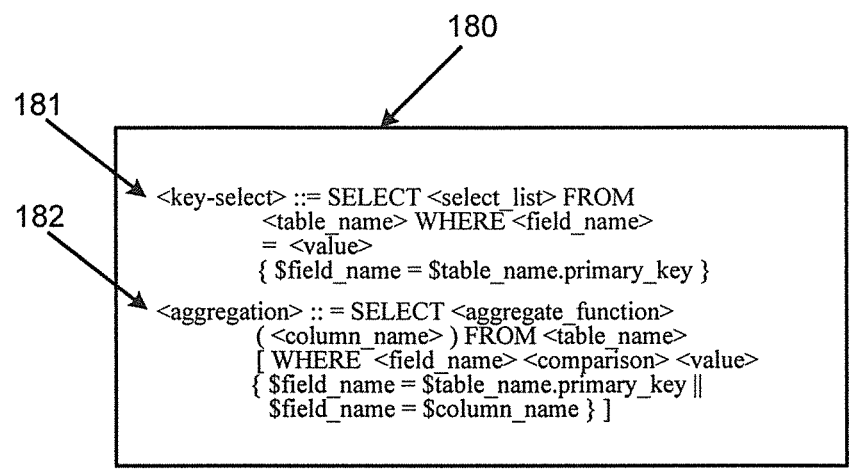
FIG. 5 illustrates query grammar, according to an example of the present disclosure.
Figure 6:
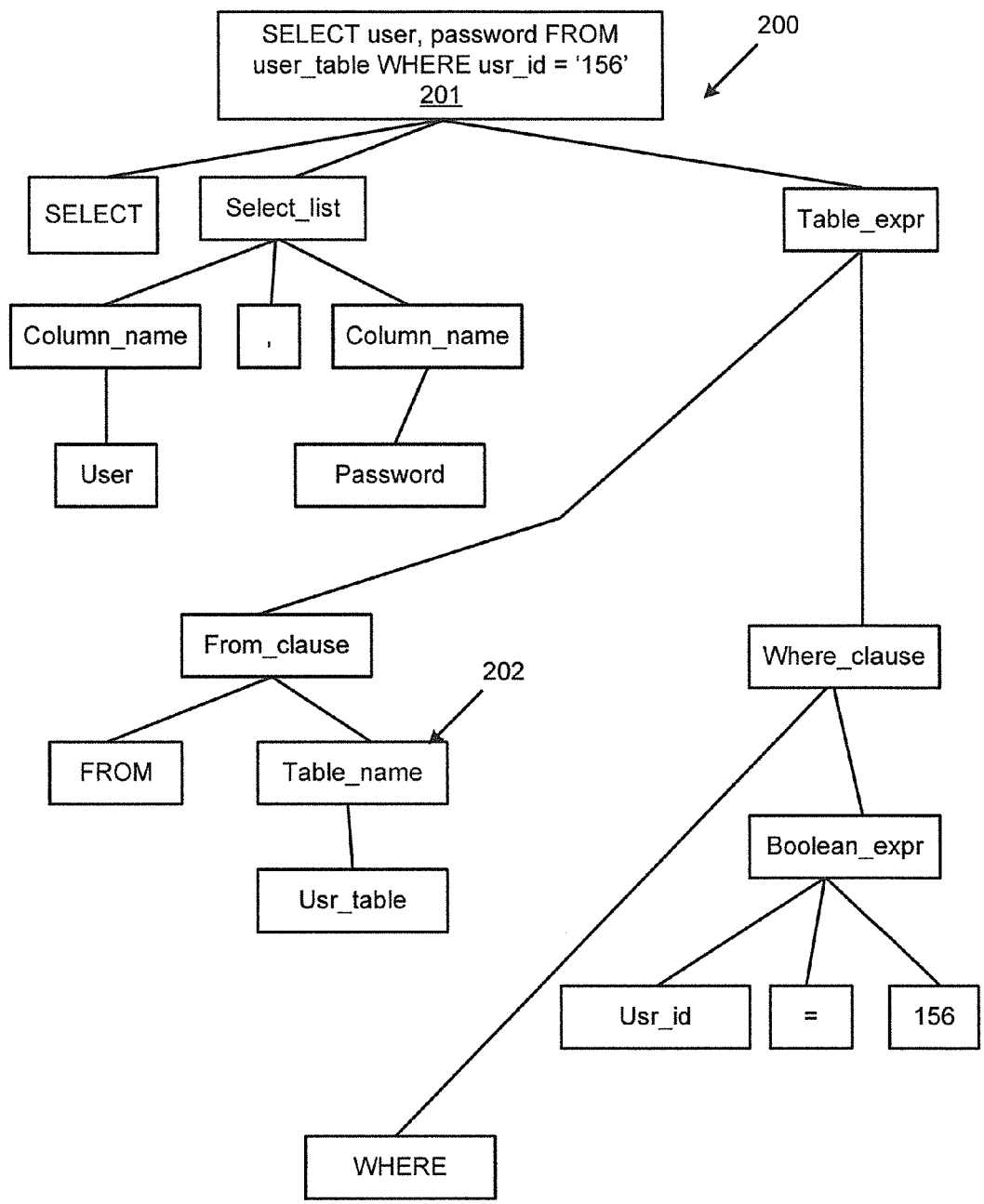
FIG. 6 illustrates an abstract syntax tree (AST) of a structured query language (SQL) query, according to an example of the present disclosure.

Referring to FIGS. 1, 5 and 6, the query identification module 151 may identify query patterns suitable for the NoSQL data store 152. The query identification module 151 may parse queries 153, which may be SQL queries, issued by the application servers 154 into abstract syntax trees (ASTs). For example, referring to FIG. 5, a query grammar 180 is illustrated, according to an example of the present disclosure. FIG. 6 illustrates an AST 200 for a SQL query 201 parsed by the query identification module 151. From the AST 200 of the SQL query 201, the query identification module 151 may identify a target table of the SQL query 201. For example, a target table may be identified by the table name at 202. The query identification module 151 may further determine whether the SQL query 201 is a read or write query, and compute a percentage of read queries for the target table. Since NoSQL systems may not support join, the query identification module 151 may analyze "from" clauses that contain one table name. For example, referring to FIGS. 8 and 9, a "persons" table 240 and an "orders" table 260 are illustrated. If a query is "Select*FROM Persons", the query identification module 151 may use the query to extract the table name persons for the persons table 240. Similarly, the query identification module 151 may use the query to extract the table name orders for the orders table 260 for a "Select*FROM Orders" query.

The query identification module 151 may identify query patterns that are suitable for the NoSQL data store 152 by defining suitable query patterns in the form of annotated backus normal form (BNF) grammars. For example, referring to FIG. 5, the first grammar "key-select" at 181 matches all select queries that select data from a single table via the primary key of the table. Such queries may be served by a key-value store for the NoSQL data store 152 with good performance. The second grammar "aggregation" at 182 matches select queries that aggregate a single column of a single table, for which column stores may provide good performance. If a significant portion (e.g., 95%) of all queries to a table matches one of these patterns (i.e., patterns 181 or 182), then using the NoSQL data store 152 to manage the table may have a high potential to achieve performance gains.

The query identification module 151 may parse SQL queries that are in an auto commit mode, where a transaction contains only one SQL query. For SQL queries that belong to multi-query transactions, these queries may be disregarded. However, the query identification module 151 may identify which tables the SQL queries that belong to multi-query transactions are for, and count these queries as write queries to these tables, even if they are select queries.

In an example of application of the query identification module 151, for an e-store application, when a new product (e.g., a television) arrives and is updated in an inventory table, the data in different replicas of the database for the inventory table may be inconsistent for a certain amount of time. If a customer were to search for a television and query an outdated replica that contains other kinds of televisions except for the newly added television, the e-store application may tolerate the inconsistency since eventually after a certain amount of time the customer will be able to see the newly added television. In this case, the query identification module 151 may identify query patterns with respect to a search for new televisions for the inventory table, and identify such query patterns as being suitable for the NoSQL data store 152.

Referring to FIG. 1, the data table ranking module 165 may rank data tables with a linear combination of percentage of read queries and percentage of query patterns suitable for the NoSQL data store 152. As discussed herein, the query identification module 151 may monitor and parse the SQL queries 153 to identify all queries of a data table, calculate how many of the identified queries are read queries, and how many of the identified queries match query patterns suitable for the NoSQL data store 152.

The data table ranking module 165 may rank data tables based, for example, on the equation:

$$\text{rank}(t) = \lambda_1 rp(t) + \lambda_2 kp(t) + \lambda_3 \max_c(ap(t,c)) \quad \text{Equation (1)}$$

For Equation (1), $rp(t)$ may represent percentage of read queries of a table t, $kp(t)$ may represent percentage of queries of the table t that match a "key-select" pattern, and $ap(t, c)$ may represent percentage of queries of the table t that match an "aggregation" pattern and aggregate over the data in a column c of the table t. For Equation (1), $rp(t)$, $kp(t)$, and $ap(t, c)$ may be determined as follows:

$$rp(t) = \frac{\text{read\_queries}(t)}{\text{all\_queries}(t)} \quad \text{Equation (2)}$$

$$kp(t) = \frac{\text{key\_select\_queries}(t)}{\text{all\_queries}(t)} \quad \text{Equation (3)}$$

$$ap(t, c) = \frac{\text{aggregation\_queries}(t, c)}{\text{all\_queries}(t)} \quad \text{Equation (4)}$$

For Equation (1), the linear coefficients $\lambda_1$, $\lambda_2$, and $\lambda_3$ may be tuned, for example, based on user preferences, to increase or decrease the weight assigned to $rp(t)$, $kp(t)$, and $ap(t, c)$. Alternatively, the linear coefficients $\lambda_1$, $\lambda_2$, and $\lambda_3$ may be set, for example, at 0.333, to assign generally equal weights to $rp(t)$, $kp(t)$, and $ap(t, c)$.

The user selection module 166 may present the ranked data tables to a user (e.g., via a user interface) to allow the user to decide which data table can tolerate data inconsistency, and thus can be managed using the NoSQL data store 152. The data tables may be presented to a user with their rankings, rank(t), rp(t), kp(t), and $\max_c(ap(t, c))$, to determine, based, for example, on the semantics of the data, whether a table should be managed by the NoSQL data store 152, or by the RDBMS 160. The rankings of the data tables may be used as a guide by the user to determine which data tables should be managed by the NoSQL data store 152, or by the RDBMS 160. For example, higher ranked data tables may represent a higher percentage of read queries of a table t (i.e., rp(t)), a higher percentage of queries of the table t that match the "key-select" pattern (i.e., kp(t)), and a higher percentage of queries of the table t that match the "aggregation" pattern and aggregate over the data in the column c (i.e., ap(t, c)) of the table t.

The data table determination module 167 may automatically determine which data table can tolerate data inconsistency from the ranked data tables, and thus can be managed using the NoSQL data store 152. For example, the data table determination module 167 may compare the rankings of the data tables (i.e., rank(t), rp(t), kp(t), and $\max_c(ap(t, c))$) to predetermined thresholds (i.e., threshold (rank(t)), threshold (rp(t)), threshold (kp(t)), and threshold ($\max_c(ap(t, c))$)), respectively, to determine which data tables meet and/or exceed the predetermined thresholds, and thus should be managed by the NoSQL data store 152, or otherwise, by the RDBMS 160.

Figure 8:
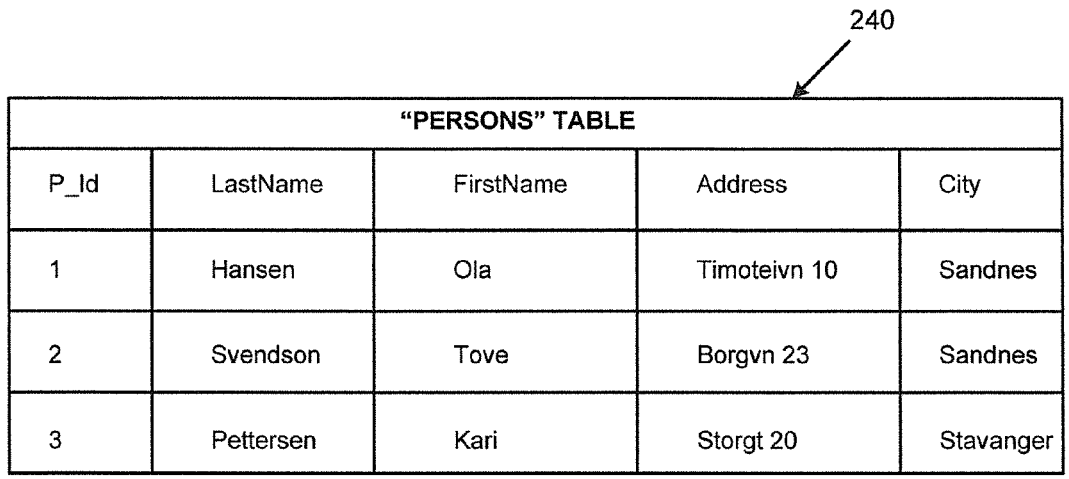
FIG. 8 illustrates a "persons" table in a database, according to an example of the present disclosure.

An example of application of the data table ranking module 165 is discussed with reference to FIGS. 8-10. Referring to FIG. 8, for the persons table 240, assuming that 90% of the queries executed are update or insert queries, this equates to rp(t)=0.1. Further assuming 5% of the queries are select queries accessed by a primary key, this equates to kp(t)=0.05. If no aggregation queries are executed on the persons table 240, this equates to $\max_c(ap(t, c))$=0.0. As a result, for the persons table 240, rank(t)=0.05 (assuming the values of the linear coefficients $\lambda_1$, $\lambda_2$, and $\lambda_3$ are each 0.05). The low value for the ranking for the persons table 240 may indicate that the persons table 240 is not suitable for being managed by the NoSQL data store 152, and instead, the persons table 240 should be managed by the RDBMS 160.

Figure 9:
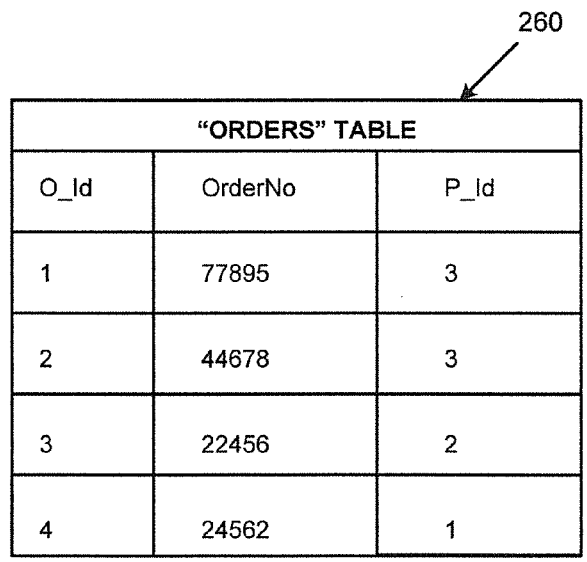
FIG. 9 illustrates an "orders" table in a database, according to an example of the present disclosure.
Figure 10:
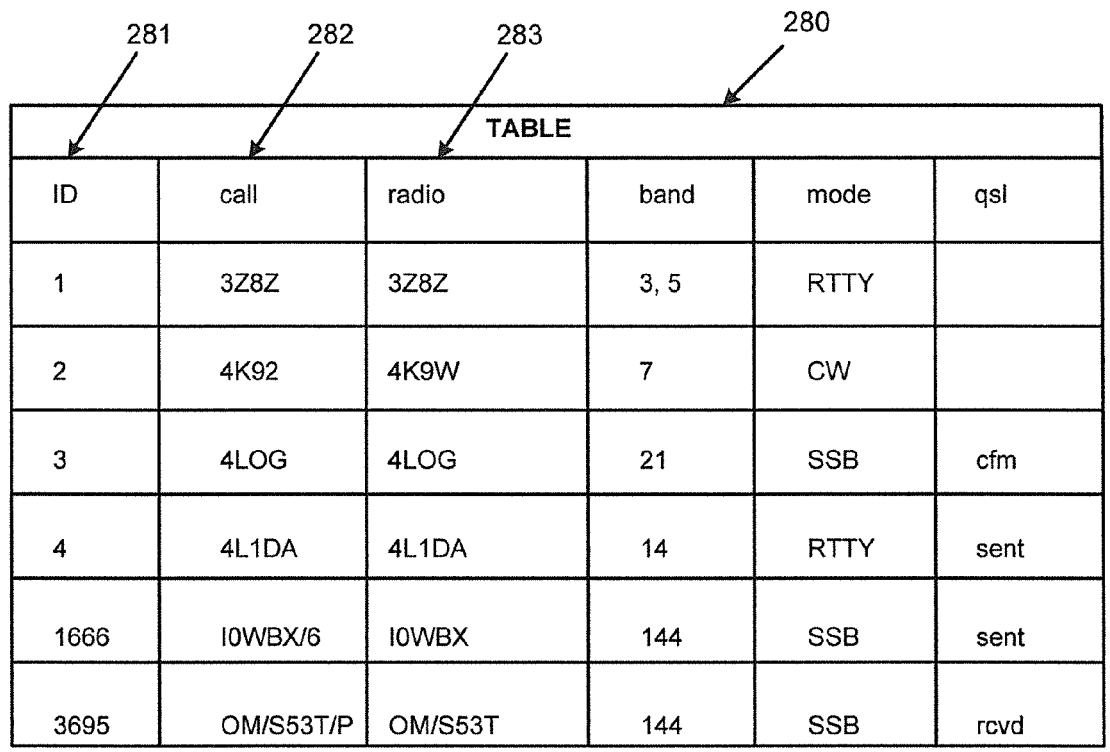
FIG. 10 illustrates an table in a database, according to an example of the present disclosure.

Alternatively, referring to FIG. 9, for the orders table 260, assuming that 90% of the queries executed are select queries, this equates to rp(t)=0.9. Further assuming 80% of the queries are select queries accessed by a primary key, this equates to kp(t)=0.8. If 70% of the aggregation queries are executed on the orders table 260, this equates to $\max_c(ap(t, c))$=0.7. As a result, for the orders table 260, rank(t)=0.8 (assuming the values of the linear coefficients $\lambda_1$, $\lambda_2$, and $\lambda_3$ are each 0.8). The high value for the ranking for the orders table 260 may indicate that the orders table 260 is suitable for being managed by the NoSQL data store 152. The data table determination module 167 may compare the rankings of the orders table 260 (i.e., rank(t)=0.8, rp(t)=0.9, kp(t)=0.8, and $\max_c$(ap(t, c))=0.7) to predetermined thresholds (e.g., threshold (rank (t))=0.6, threshold (rp(t))=0.6, threshold (kp(t))=0.6, and threshold ($\max_c$(ap(t, c)))=0.6), respectively, to automatically determine that the orders table 260 exceeds the predetermined thresholds, and thus should be managed by the NoSQL data store 152. In the same manner, the data table determination module 167 may automatically determine that the persons table 240 does not meet or exceed the predetermined thresholds, and thus should not be managed by the NoSQL data store 152, but instead, should be managed by the RDBMS 160.

Figure 7:
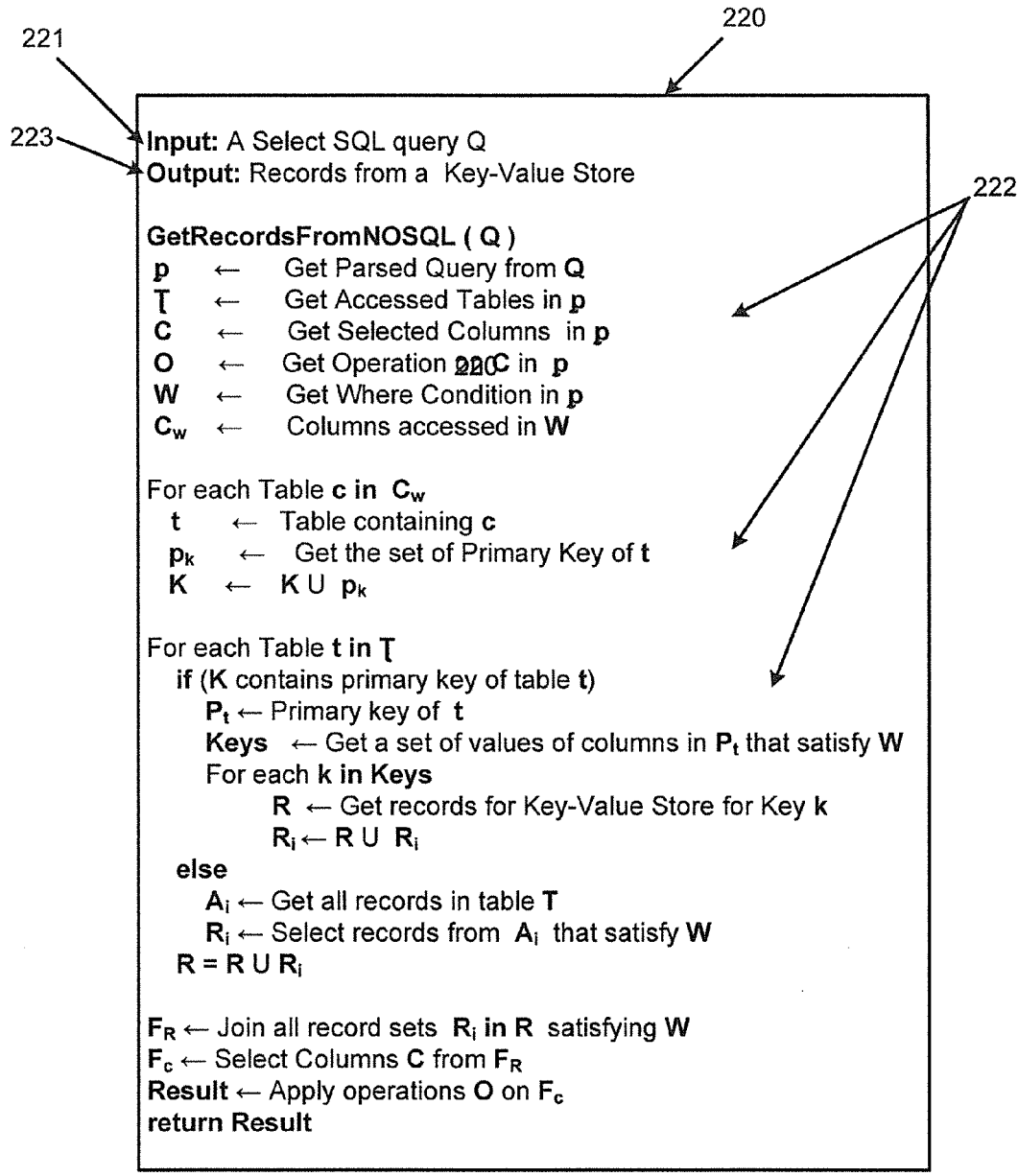
FIG. 7 illustrates a process for simulating a SQL query on top of a key-value data store, according to an example of the present disclosure.

The query translation module 168 may automatically translate read and/or update queries targeting the selected data tables by the user selection module 166 or the data table determination module 167 to NoSQL API calls. Thus, the NoSQL suitable queries 158 may be automatically translated by the query translation module 168 and forwarded to the NoSQL data store 152. The data store setup module 169 may create a data structure in the NoSQL data store 152 according to the structure of the original table. For example, for a table with a large portion of the queries matching a key-select pattern, the data store setup module 169 may create a key-value store for the NoSQL data store 152 to manage the table. To create a data structure in the key-value store for the NoSQL data store 152, the data store setup module 169 may use the primary key of the table as the key, with the value containing information from all other fields. For example, referring to FIG. 10, for the table 280, the data store setup module 169 may use the primary key 281 of the table 280 as the key, with the value containing information from all other fields (i.e., fields 282, 283 etc.). With regard to combining multiple data fields, such multiple fields of a data row may be written into an extensible markup language (XML) snippet, and stored as the value in the key-value store for the NoSQL data store 152. Upon receiving a query (i.e., one of the queries 153) from the application 156, the query may be executed on the key-value store for the NoSQL data store 152 and appropriate data may be retrieved from the key-value store in the form of the responses 162. FIG. 7 illustrates the pseudo code 220 for translating SQL queries to key-value store queries for the NoSQL data store 152. For example, FIG. 7 illustrates the pseudo code 220 for translating a SQL query Q at 221 to key-value store queries at 222 for the NoSQL data store 152, with the output at 223 being records from the key-value store for the NoSQL data store 152. If the key-value store for the NoSQL data store 152 returns the data, the query translation module 168 may parse the value as XML, retrieve the values of data fields from the XML, and return the values as the responses 163 to the application 156. If the key-value store for the NoSQL data store 152 returns no data, then the original query may be issued to the RDBMS 160. Further, the key-value store for the NoSQL data store 152 may be populated with the data retrieved from the RDBMS 160, and the data may be returned to the application 156 as the response 163. The data store setup module 169 may also monitor all the update queries to the table being processed, determine which entries are modified, and invalidate corresponding entries in the key-value store for the NoSQL data store 152.

Figure 11:
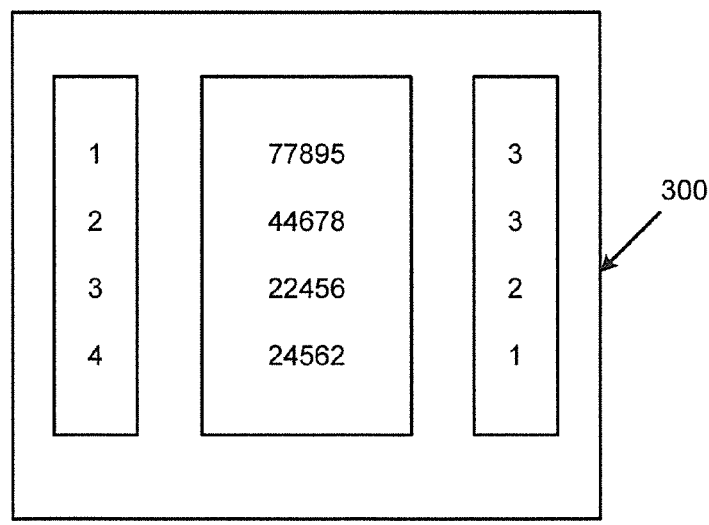
FIG. 11 illustrates a column store, according to an example of the present disclosure.

For a table with majority of queries matching the aggregation pattern, the system 150 may use a column store for the NoSQL data store 152 to manage such queries. An example of a column store 300 is shown in FIG. 11. The management of such queries matching the aggregation pattern may be similar to the management of queries using the key-value store for the NoSQL data store 152.

For the example of the persons table 240 and the orders table 260 of FIGS. 8 and 9, the data store setup module 169 may create a data structure in the NoSQL data store 152 according to the structure of the original tables. For example, if the persons table 240 and the orders table 260 which are connected are used only for read join queries, then the tables may be ranked for suitability for the NoSQL data store 152. The persons table 240 and the orders table 260 may be denormalized and transformed to the NoSQL data store 152, for example, by determining key-value pairs. For example, if the persons table 240 and the orders table 260, the key-value pair for P_ID may be determined as P_ID→LastName+FirstName+Address+City+O_Id+Order_No.

From the queries 153, NoSQL suitable queries 158 that are suitable for the NoSQL data store 152 may be forwarded to the NoSQL data store 152 for processing, and relational database queries 159 that may not be considered suitable for the NoSQL data store 152 may be forwarded to the RDBMS 160 for processing by the relational database server 161. For example, tables in which relatively few inserts and/or update queries are executed may suitable for the NoSQL data store 152 that may include a key-value store and/or a column oriented store. Further, relational database queries 159 that may not be considered suitable for the NoSQL data store 152, such as, for example, insert or update queries, may be forwarded to a RDBMS 160 for processing by the relational database server 161. For example, if in a table, if data is accessed using a primary key in the "where" clause, the table may be considered suitable for a key-value store for the NoSQL data store 152. Therefore, queries that access data using a primary key may be directed to the key-value store for the NoSQL data store 152. However, if in a table only a few columns are accessed, a column store for the NoSQL data store 152 may be considered suitable. Further, aggregation queries in which the values of whole columns are accessed may also be considered suitable for a column store for the NoSQL data store 152. Therefore, queries that access a few columns or aggregation queries may be directed to a column store for the NoSQL data store 152.

Generally, the NoSQL data store 152 may handle read queries, and update queries may be handled by the RDBMS 160. However, in order for read and update queries to be handled by the NoSQL data store 152, the conflict detection module 170 may detect and identify possible conflicts and resolution with respect to update queries. For example, the conflict detection module 170 may detect and identify possible conflicts and resolution with respect to potential data consistency issues. The conflict identification and resolution may be based, for example, on the semantics of the data. For example, concurrent updates to an inventory table of an online store may result in two customers buying the same item, which should ideally be addressed immediately by canceling one of the two orders. In this case, the conflict detection module 170 may detect and identify possible conflicts with respect to the purchase of the same item, and issue a resolution to cancel one of the two orders. The semantics of the data with respect to purchase of items may dictate immediate resolution of possible conflicts. In another example, concurrent updates to a table recording user browsing history, however, may be propagated at a later time. In this case, the conflict detection module 170 may detect and identify possible conflicts with respect to the recordation of user browsing history, and issue a resolution to record the browsing history within a predetermined time period. The semantics of the data with respect to recordation of user browsing history may dictate delayed resolution of possible conflicts. In yet another example, suppose one replica of a table contains records with p1, p2, and p3, and another replica of the same table contains records p2, p3, and p4, if both tables are to contain all possible records, the conflict detection module 170 may detect and identify possible conflicts with respect to the different records of these tables, and issue a resolution to take a union of all the records within a predetermined time period. Thus, the conflict detection module 170 may resolve the conflict by updating both the replicas of the tables to include (p1, p2, p3, and p4).

Figure 12:
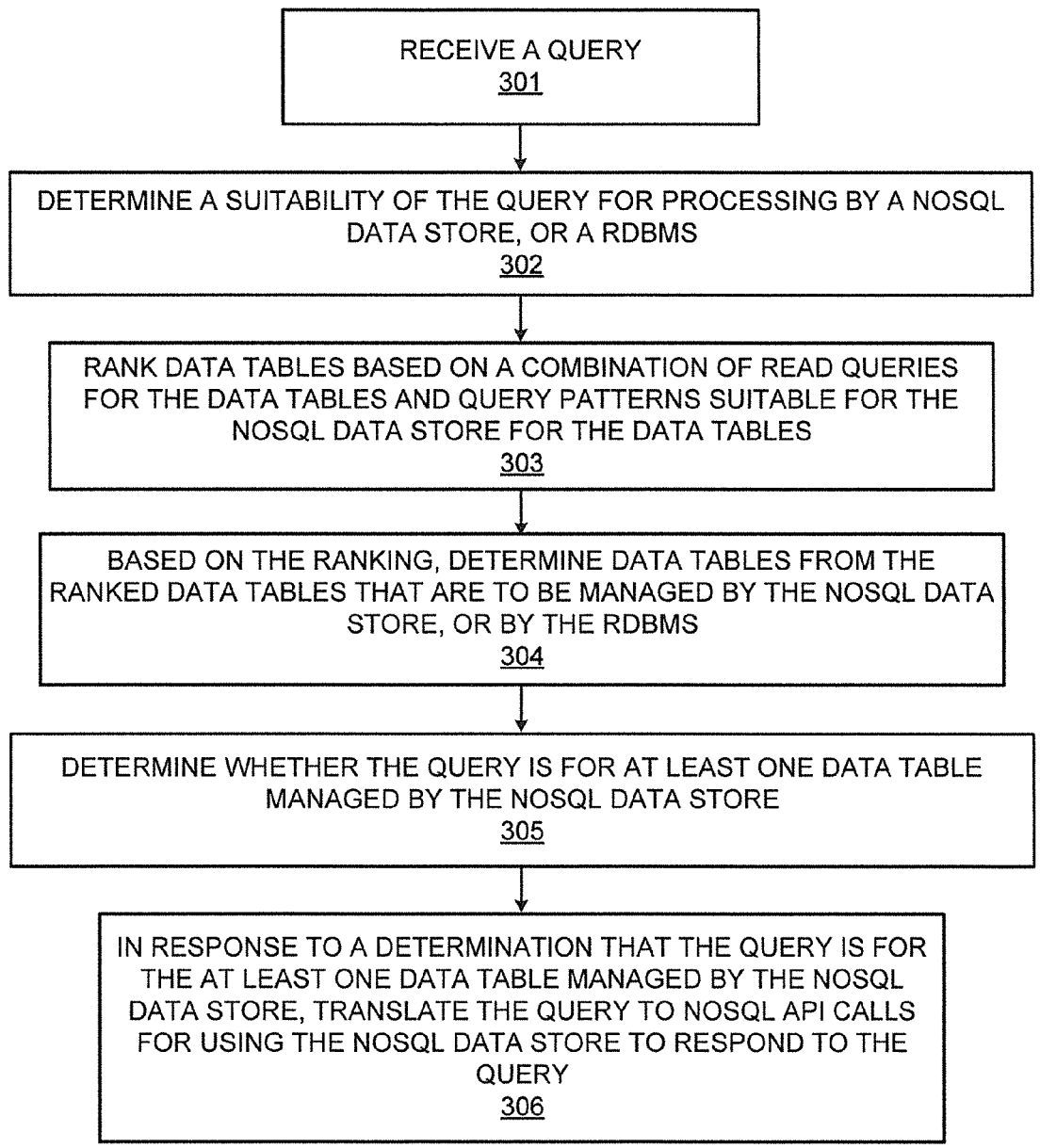
FIG. 12 illustrates a method for data consistency management, according to an example of the present disclosure.

FIG. 12 illustrates a flowchart of a method 300 for data consistency management, corresponding to the example of the data consistency management system 150 whose construction is described in detail above. The method 300 may be implemented on the data consistency management system 150 with reference to FIG. 1 by way of example and not limitation. The method 300 may be practiced in other systems.

Referring to FIG. 12, for the method 300, at block 301, a query may be received. For example, referring to FIG. 1, the query identification module 151 may receive queries 153 from the application servers 154.

At block 302, a suitability of the query for processing by a NoSQL data store, or a RDBMS may be determined. For example, referring to FIG. 1, the query identification module 151 may identify query patterns suitable for the NoSQL data store 152, or otherwise for the RDBMS 160. Determining the suitability of the query for processing by the NoSQL data store 152, or the RDBMS 160 may further include determining whether the query is a select query that selects data from a data table via a primary key of the data table, and determining whether the query is a select query that aggregates a single column of a data table. If the query is a select query that selects data from a data table via a primary key of the data table, a determination may be made if a predetermined percentage of queries to the data table are select queries that select data from the data table via the primary key of the data table, and based on a determination that a predetermined percentage of queries to the data table are select queries that select data from the data table via the primary key of the data table, a key-value store may be used for the NoSQL data store 152 for processing the query. If the query is a select query that aggregates a single column of a data table, a determination may be made if a predetermined percentage of queries to the data table are select queries that aggregate the single column of the data table, and based on a determination that a predetermined percentage of queries to the data table are select queries that aggregate the single column of the data table, a column store may be used for the NoSQL data store 152 for processing the query. Determining the suitability of the query for processing by the NoSQL data store 152, or the RDBMS 160 may further include determining whether the query is an update query that updates data in the data table managed by the NoSQL data store 152, determining whether a conflict exists in the data of the data table based on processing of the update query, and based on a determination that a conflict exists in the data of the data table based on processing of the update query, resolving the conflict based on a conflict resolution policy (i.e., by using the conflict detection module 170).

At block 303, data tables may be ranked based on a combination of read queries for the data tables and query patterns suitable for the NoSQL data store for the data tables. One or more of the data tables may contain information for responding to the query. For example, referring to FIG. 1, the data table ranking module 165 may rank data tables with a linear combination of percentage of read queries and percentage of query patterns suitable for the NoSQL data store 152. Ranking the data tables may further include ranking a data table based on a linear combination of a percentage of the read queries for the data table, a percentage of queries of the data table that matches a key-select pattern, and a percentage of queries of the data table that matches an aggregation pattern and aggregate over data in a column of the data table.

At block 304, based on the ranking, data tables from the ranked data tables that are to be managed by the NoSQL data store, or by the RDBMS may be determined. For example, referring to FIG. 1, the data table determination module 167 may automatically determine which data table can tolerate data inconsistency from the ranked data tables, and thus can be managed using the NoSQL data store 152. Determining the data tables from the ranked data tables that are to be managed by the NoSQL data store, or by the RDBMS may further include determining data tables for which the ranking exceeds a predetermined threshold. Determining the data tables from the ranked data tables that are to be managed by the NoSQL data store, or by the RDBMS may further include ranking data tables based on a linear combination of a percentage of the read queries for the data tables, a percentage of queries of the data tables that matches a key-select pattern, and a percentage of queries of the data tables that matches an aggregation pattern and aggregate over data in columns of the data tables, and determining data tables for which one or more of the rankings related to the percentage of the read queries, the percentage of queries of the data tables that matches a key-select pattern, and the percentage of queries of the data tables that matches an aggregation pattern and aggregate over data in a column of the data table, exceed one or more predetermined thresholds related to the percentage of the read queries, the percentage of queries of the data tables that matches a key-select pattern, and the percentage of queries of the data tables that matches an aggregation pattern and aggregate over data in a column of the data table. Alternatively, the ranked data tables may be output for selection for management by the NoSQL data store. For example, referring to FIG. 1, the user selection module 166 may output the ranked data tables for selection for management by the NoSQL data store 152. Upon receiving selection of data tables from the ranked data tables that are to be managed by the NoSQL data store 152, the selected data tables from the ranked data tables may be assigned for management by the NoSQL data store 152, and the remaining data tables from the ranked data tables may be managed by the RDBMS 160.

At block 305, a determination is made whether the query is for one or more data tables managed by the NoSQL data store. For example, referring to FIG. 1, the query identification module 151 may determine whether the query is for one or more data tables managed by the NoSQL data store 152.

At block 306, based on a determination that the query is for the one or more data tables managed by the NoSQL data store, the query may be translated to NoSQL API calls for using the NoSQL data store to respond to the query. For example, referring to FIG. 1, the query translation module 168 may automatically translate read and/or update queries targeting the selected data tables by the user selection module 166 or the data table determination module 167 to NoSQL API calls. Further, based on a determination that the query is not for the one or more data tables managed by the NoSQL data store 152, the query may be forwarded to the RDBMS 160. Translating the query may further include creating a data structure in the NoSQL data store according to the structure of the one or more data tables. Translating the query may further include determining if the one or more data tables includes a high percentage of queries that match a key-select pattern, and based on a determination that the one or more data tables includes a high percentage of queries that match a key-select pattern, creating a key-value store for the NoSQL data store by using a primary key of the one or more data tables (i.e., using the data store setup module 169). Translating the query may further include determining if the one or more data tables includes a high percentage of queries that match an aggregation pattern, and based on a determination that the one or more data tables includes a high percentage of queries that match an aggregation pattern, creating a column store for the NoSQL data store 152 (i.e., using the data store setup module 169).

Figure 13:
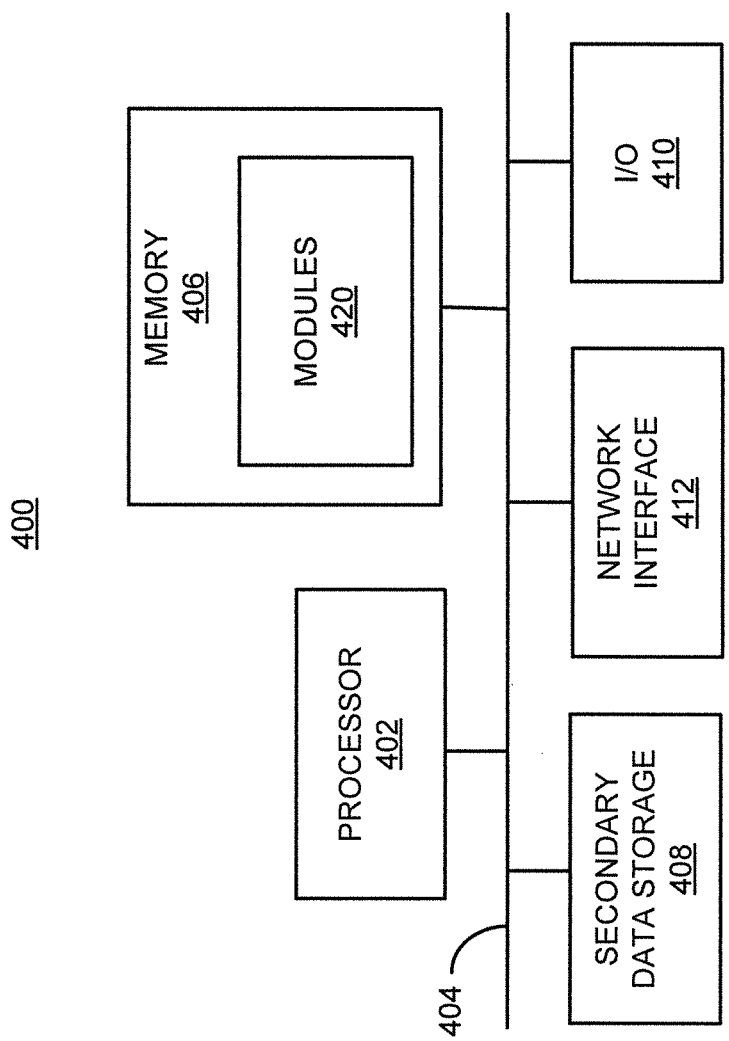
FIG. 13 illustrates a computer system, according to an example of the present disclosure.

FIG. 13 shows a computer system 400 that may be used with the examples described herein. The computer system 400 represents a generic platform that includes components that may be in a server or another computer system. The computer system 400 may be used as a platform for the system 150. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules of the system 150 described with reference to FIGS. 1-11.

The computer system 400 may include an I/O device 410, such as a keyboard, a mouse, a display, etc. The computer system 400 may include a network interface 412 for connecting to a network. Other known electronic components may be added or substituted in the computer system 400.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A data consistency management system comprising:
a memory storing machine readable instructions executed by at least one hardware processor to:
receive a query;
determine a suitability of the query for processing by a not-only structured query language (NoSQL) data store;
rank data tables based on a combination of read queries for the data tables and query patterns suitable for the NoSQL data store for the data tables, at least one of the data tables containing information for responding to the query;
based on the ranking, determine data tables from the ranked data tables that are to be managed by the NoSQL data store, or by a relational database management system (RDBMS);
determine whether the query is for at least one data table managed by the NoSQL data store; and
based on a determination that the query is for the at least one data table managed by the NoSQL data store, translate the query to NoSQL application programming interface (API) calls for using the NoSQL data store to respond to the query.

2. The data consistency management system of claim 1, further comprising machine readable instructions to:
based on a determination that the query is not for the at least one data table managed by the NoSQL data store, forward the query to the RDBMS.

3. The data consistency management system of claim 1, wherein the machine readable instructions to determine the suitability of the query for processing by the NoSQL data store further comprise:
determining whether the query is a select query that selects data from a data table via a primary key of the data table; and
determining whether the query is a select query that aggregates a single column of a data table.

4. The data consistency management system of claim 1, wherein the machine readable instructions to determine the suitability of the query for processing by the NoSQL data store further comprise:
determining whether the query is a select query that selects data from a data table via a primary key of the data table;
determining if a predetermined percentage of queries to the data table are select queries that select data from the data table via the primary key of the data table; and
based on a determination that a predetermined percentage of queries to the data table are select queries that select data from the data table via the primary key of the data table, using a key-value store for the NoSQL data store for processing the query.

5. The data consistency management system of claim 1, wherein the machine readable instructions to determine the suitability of the query for processing by the NoSQL data store further comprise:
determining whether the query is a select query that aggregates a single column of a data table;
determining if a predetermined percentage of queries to the data table are select queries that aggregate the single column of the data table; and
based on a determination that a predetermined percentage of queries to the data table are select queries that aggregate the single column of the data table, using a column store for the NoSQL data store for processing the query.

6. The data consistency management system of claim 1, wherein the machine readable instructions to rank the data tables further comprise:
ranking the data tables based on a linear combination of a percentage of the read queries for the data tables and a percentage of the query patterns suitable for the NoSQL data store for the data tables.

7. The data consistency management system of claim 1, wherein the machine readable instructions to rank the data tables further comprise:
ranking a data table based on a linear combination of a percentage of the read queries for the data table, a percentage of queries of the data table that matches a key-select pattern, and a percentage of queries of the data table that matches an aggregation pattern and aggregate over data in a column of the data table.

8. The data consistency management system of claim 1, wherein the machine readable instructions to determine the data tables from the ranked data tables that are to be managed by the NoSQL data store, or by the RDBMS further comprise:
   determining data tables for which the ranking exceeds a predetermined threshold.

9. The data consistency management system of claim 1, wherein the machine readable instructions to determine the data tables from the ranked data tables that are to be managed by the NoSQL data store, or by the RDBMS further comprise:
   ranking data tables based on a linear combination of a percentage of the read queries for the data tables, a percentage of queries of the data tables that matches a key-select pattern, and a percentage of queries of the data tables that matches an aggregation pattern and aggregate over data in columns of the data tables; and
   determining data tables for which at least one of the rankings related to the percentage of the read queries, the percentage of queries of the data tables that matches a key-select pattern, and the percentage of queries of the data tables that matches an aggregation pattern and aggregate over data in a column of the data table, exceed at least one predetermined threshold related to the percentage of the read queries, the percentage of queries of the data tables that matches a key-select pattern, and the percentage of queries of the data tables that matches an aggregation pattern and aggregate over data in a column of the data table.

10. The data consistency management system of claim 1, wherein the machine readable instructions to translate the query further comprise:
    creating a data structure in the NoSQL data store according to the structure of the at least one data table.

11. The data consistency management system of claim 1, wherein the machine readable instructions to translate the query further comprise:
    determining if the at least one data table includes a high percentage of queries that match a key-select pattern; and
    based on a determination that the at least one data table includes a high percentage of queries that match a key-select pattern, creating a key-value store for the NoSQL data store by using a primary key of the at least one data table.

12. The data consistency management system of claim 1, wherein the machine readable instructions to translate the query further comprise:
    determining if the at least one data table includes a high percentage of queries that match an aggregation pattern; and
    based on a determination that the at least one data table includes a high percentage of queries that match an aggregation pattern, creating a column store for the NoSQL data store.

13. The data consistency management system of claim 1, wherein the machine readable instructions to determine the suitability of the query for processing by the NoSQL data store further comprise:
    determining whether the query is an update query that updates data in the at least one data table managed by the NoSQL data store;
    determining whether a conflict exists in the data of the at least one data table based on processing of the update query; and
    based on a determination that a conflict exists in the data of the at least one data table based on processing of the update query, resolving the conflict based on a conflict resolution policy.

14. A method for data consistency management, the method comprising:
    receiving a query;
    determining a suitability of the query for processing by a not-only structured query language (NoSQL) data store;
    ranking data tables based on a combination of read queries for the data tables and query patterns suitable for the NoSQL data store for the data tables, at least one of the data tables containing information for responding to the query;
    outputting the ranked data tables for selection for management by the NoSQL data store;
    receiving selection of data tables from the ranked data tables that are to be managed by the NoSQL data store;
    assigning the selected data tables from the ranked data tables for management by the NoSQL data store, and remaining data tables from the ranked data tables for management by a relational database management system (RDBMS);
    determining whether the query is for at least one data table managed by the NoSQL data store; and
    based on a determination that the query is for the at least one data table managed by the NoSQL data store, translating, by a processor, the query to NoSQL application programming interface (API) calls for using the NoSQL data store to respond to the query.

15. The method of claim 14, further comprising:
    based on a determination that the query is not for the at least one data table managed by the NoSQL data store, forwarding the query to the RDBMS.

16. The method of claim 14, wherein determining the suitability of the query for processing by the NoSQL data store further comprises:
    determining whether the query is a select query that selects data from a data table via a primary key of the data table; and
    determining whether the query is a select query that aggregates a single column of a data table.

17. The method of claim 14, wherein determining the suitability of the query for processing by the NoSQL data store further comprises:
    determining whether the query is a select query that selects data from a data table via a primary key of the data table;
    determining if a predetermined percentage of queries to the data table are select queries that select data from the data table via the primary key of the data table; and
    based on a determination that a predetermined percentage of queries to the data table are select queries that select data from the data table via the primary key of the data table, using a key-value store for the NoSQL data store for processing the query.

18. The method of claim 14, wherein determining the suitability of the query for processing by the NoSQL data store further comprises:
    determining whether the query is a select query that aggregates a single column of a data table;
    determining if a predetermined percentage of queries to the data table are select queries that aggregate the single column of the data table; and based on a determination that a predetermined percentage of queries to the data table are select queries that aggregate the single column of the data table, using a column store for the NoSQL data store for processing the query.

19. The method of claim 14, wherein ranking the data tables further comprises: ranking the data tables based on a linear combination of a percentage of the read queries for the data tables and a percentage of the query patterns suitable for the NoSQL data store for the data tables.

20. A non-transitory computer readable medium having stored thereon machine readable instructions for data consistency management, the machine readable instructions when executed cause a computer system to:

receive a query;

determine a suitability of the query for processing by a not-only structured query language (NoSQL) data store, wherein the NoSQL data store provides lower data consistency than a relational database management system (RDBMS);

rank, by a processor, data tables based on a combination of read queries for the data tables and query patterns suitable for the NoSQL data store for the data tables, at least one of the data tables containing information for responding to the query;

based on the ranking, determine data tables from the ranked data tables that are to be managed by the NoSQL data store, or by the RDBMS; and use, based on a determination that the query is for at least one data table managed by the NoSQL data store, the NoSQL data store to respond to the query.

* * * * *